United States Patent [19]

Leitgeb, deceased

[11] 4,330,940
[45] May 25, 1982

[54] DEVICE FOR MEASURING THE OIL LEVEL IN CLOSED HOUSINGS

[75] Inventor: Walter Leitgeb, deceased, late of Bergisch Gladbach, Fed. Rep. of Germany, by Waltraud J. E. Leitgeb, Andreas G. J. Leitgeb, Martin J. H. Leitgeb, Johanna G. M. A. Leitgeb, heirs

[73] Assignee: Klöckner-Humboldt-Deutz Aktiengesellschaft, Cologne, Fed. Rep. of Germany

[21] Appl. No.: 157,421

[22] Filed: Jun. 9, 1980

[30] Foreign Application Priority Data

Jun. 9, 1979 [DE] Fed. Rep. of Germany ....... 2923464

[51] Int. Cl.³ .............................................. G01F 23/04
[52] U.S. Cl. ................................................ 33/126.7 R
[58] Field of Search ................... 33/126.7 R, 126.4 R, 33/126

[56] References Cited

U.S. PATENT DOCUMENTS 2,239,402  4/1941  Sachs .............................. 33/126.7 R
3,296,703  1/1967  Stade et al. ..................... 33/126.7 R
4,021,924  5/1977  Haines ............................ 33/126.7 R
4,176,457  12/1979  Keffeler ......................... 33/126.7 R

FOREIGN PATENT DOCUMENTS 521727  3/1955  Italy .............................. 33/126.7 R Primary Examiner—William D. Martin, Jr.
Attorney, Agent, or Firm—Becker & Becker, Inc.

[57] ABSTRACT

A measuring device for determining the oil level in a closed housing, especially of internal combustion engines and transmissions. The device is provided with a sleeve fixed to the housing, and a removable measuring rod or dipstick. A stopper to close the sleeve is secured to the dipstick, which also has an abutment to limit the insertion depth in the measuring position of the dipstick. That end of the sleeve inside the housing terminates below the minimum oil level, and the sleeve has holes or openings for equalizing the pressure to the interior of the housing located as far as possible above the maximum oil level. In the measuring position, during insertion of the dipstick up to the abutment, the stopper is located below the outer end of the sleeve by at least one and one-half times the oil column level corresponding to the overpressure in the housing.

5 Claims, 6 Drawing Figures

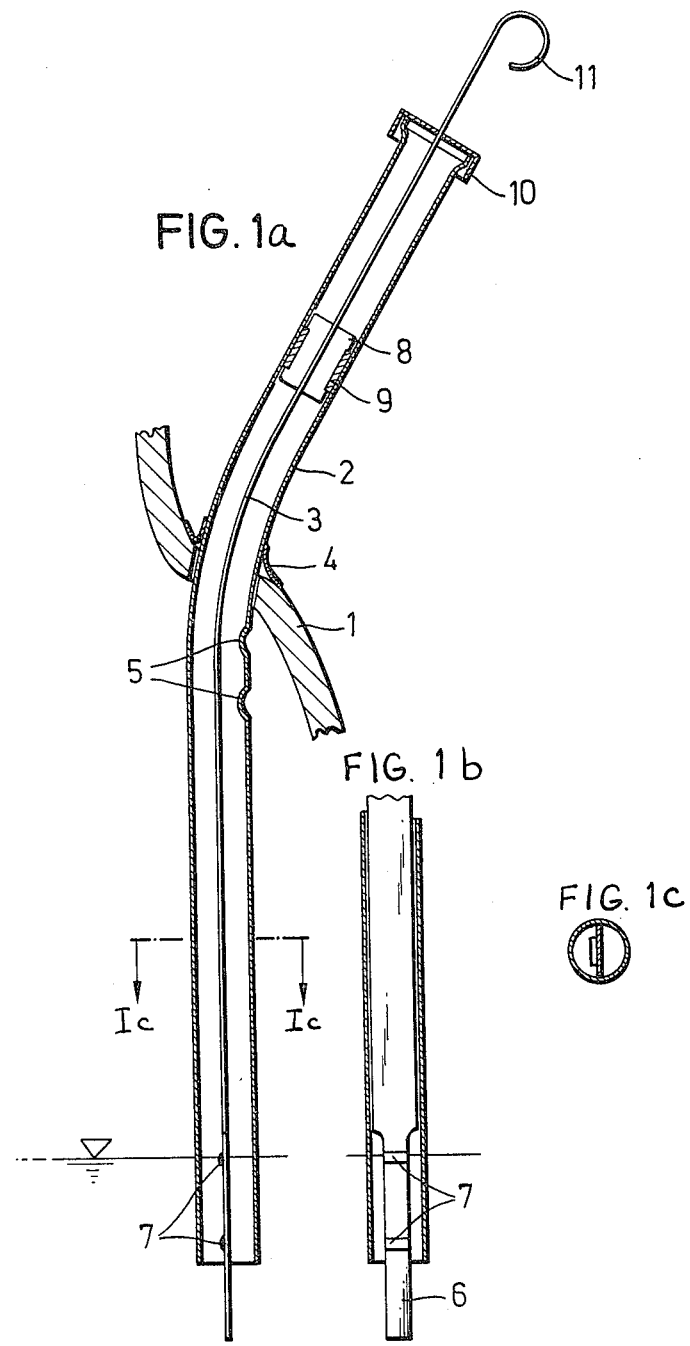

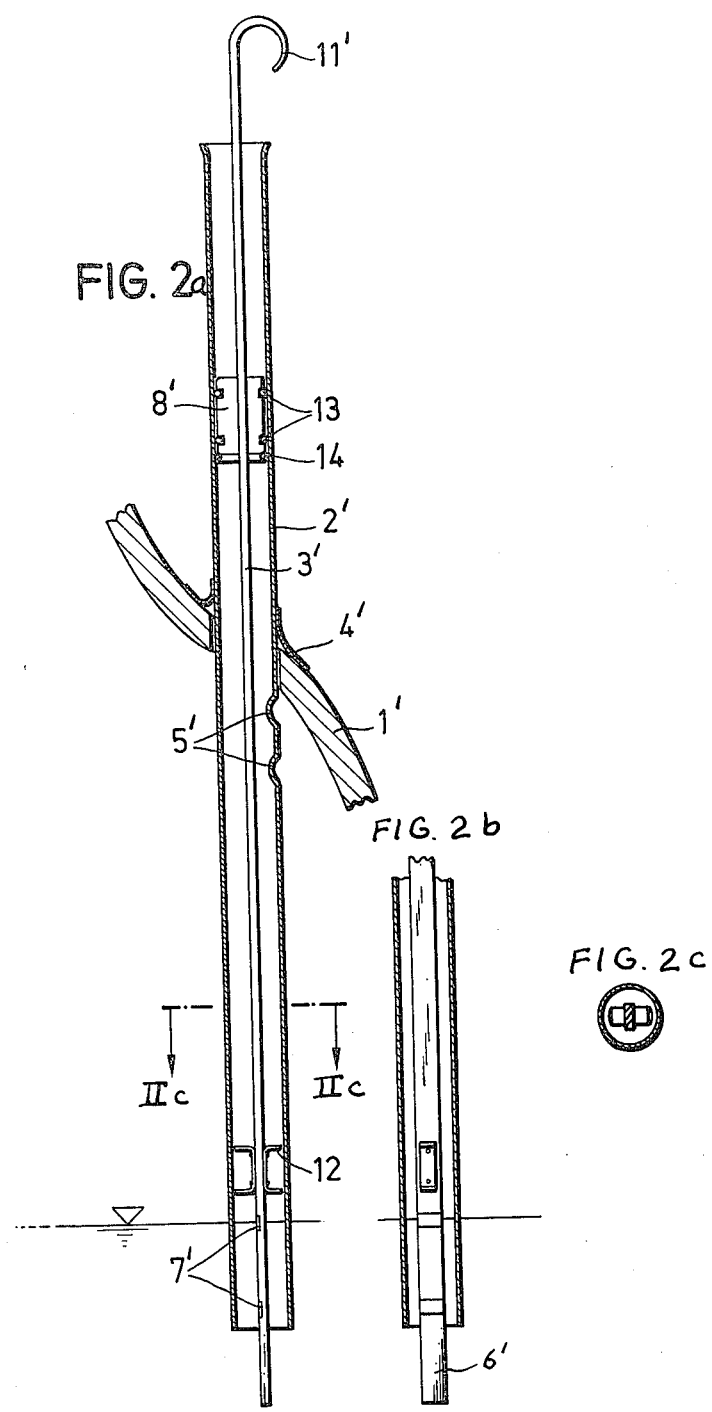

DEVICE FOR MEASURING THE OIL LEVEL IN CLOSED HOUSINGS

The present invention relates to a device for measuring the oil level in a closed housing, especially of internal combustion engines and transmissions, with a sleeve fixedly connected to the housing and a removable measuring rod or dipstick; the dipstick is provided with a stopper closing the sleeve and an abutment limiting the insertion depth in the measuring position.

Measuring devices are known in which a sleeve fixedly connected to the housing has that end thereof which is located inside the housing terminate above the maximum oil level, and in which a removable measuring rod or dipstick has that end thereof which is located inside the housing freely extend to below the minimum oil level. This free immersion of the unprotected dipstick at any location of the oil level has the disadvantage that a measuring of the oil level is not possible when mechanical movements occur inside the housing, as for instance of the crank gears in internal combustion engines, of the gears in a transmission, or during movement of the entire housing, as for example of tanks in vehicles or machine frames. For taking a measurement, the regular operation must be interrupted so that the previously fluctuating oil level can quiet down and no false oil marking is created on the dipstick. For measuring the oil level, the dipstick must be withdrawn a first time, must be cleaned and must then be re-introduced into the sleeve, whereby the desired oil marking results, and then the dipstick can be withdrawn a second time and can be inspected to determine the oil level.

A basic object of the present invention is to create a measuring device which is capable of functioning also during operation of the respective system or machine containing the housing, and which makes possible the checking of the dipstick while withdrawing it only once.

This object, and other objects and advantages of the present invention, will appear more clearly from the following specification in connection with the accompanying drawings, in which two embodiments of the present invention are illustrated as follows:

FIG. 1a is a longitudinal section through one embodiment of the inventive arrangement;

FIG. 1b is a partially sectioned side view of the lower portion of the arrangement of FIG. 1a;

FIG. 1c is a cross section taken along the line Ic—Ic in FIG. 1a;

FIG. 2a is a longitudinal section through another embodiment of the inventive arrangement;

FIG. 2b is a partially sectioned side view of the lower portion of the arrangement of FIG. 2a; and FIG. 2c is a cross section taken along the line IIc—IIc in FIG. 2a.

It is frequently desirable to check the oil level in the housing of a machine during operation thereof. As an example for such situations, there may be mentioned internal combustion engines in current generating plants. The difficulty encountered with such measurements consists therein that it must be prevented that the swell or surge formation and possibly the oil spray formation in the housing wet the dipstick also above the actual mean oil level. A further problem is to embody the measuring device such that the bothersome wiping-off of the dipstick before the measuring step proper becomes superfluous.

The measuring device of the present invention is characterized primarily in that that end of the sleeve which is inside the housing terminates below the minimum oil level; that the sleeve is provided with holes, for equalizing the pressure to the housing interior, which are located as far as possible above the maximum oil level; and that in the measuring position, when inserting the dipstick up to the abutment, the stopper is located below the outside end of the sleeve by at least $1\frac{1}{2}$ times the oil column level corresponding to the overpressure in the housing.

This arrangement guarantees that an oil level results or adjusts itself in the sleeve which corresponds to the mean oil level in the housing, but which, because of its small surface, does not participate in the large surface movements of the oil level in the housing. Since the dipstick is completely protected against oil spray by the sleeve, an oil level marking results on the dipstick which corresponds to the true oil level and which can be checked directly during the first withdrawal of the dipstick. The pressure equalization holes and the position of the stopper assure that the oil level marking is not falsified during the withdrawal of the dipstick. A possible overpressure with respect to the environment prevailing in the housing can press the oil level in the sleeve upwardly upon opening to the environment before a release of the overpressure has occurred in the housing via the pressure equalization holes. Due to the inventive arrangement of the stopper means, at the moment of opening the dipstick has already been lifted so far out of the oil that this momentary oil level fluctuation can no longer change the oil marking on the dipstick. To avoid a wiping-off of the oil marking on the walls of the sleeve during withdrawal, in a further embodiment of the present invention, the device is so designed that in the region of the oil marking no contact can occur between the dipstick and the sleeve.

A known flexible dipstick made of a sheet metal band or strip is in this region drawn inwardly to a smaller width, while over its remaining length it has the width of the sleeve diameter, and consequently is guided coaxially therewith.

A known solid dipstick is above this region provided with a spacer or distance maintaining means which must not close the cross section of the sleeve completely in order to be able to effect a pressure equalization; this spacer can, for example, be in the form of riveted-on resilient sheet metal strips which project radially from the dipstick.

Referring now to the drawings in detail, FIGS. 1a–1c show a housing wall 1 through which extends a bent sleeve 2 in which the measuring rod or dipstick 3 is guided. The sleeve 2 is held in the housing wall 1 by a rigid collar 4, and that end of the sleeve 2 located inside the housing extends vertically downwardly to below the oil level. The sleeve 2 is provided with pressure equalizing openings 5 which are located inside the housing and are protected against oil spray. The dipstick 3 comprises a sheet metal strip the width of which corresponds essentially to the inner diameter of the sleeve 2, though at the lower end in the measuring region 6 the width of the strip is reduced a little on both sides. The measuring region 6 is provided with two markings 7 for the highest and lowest permissible oil level. At that end located outside the housing, the dipstick 3 is provided with a stopper 8 which closes the sleeve 2 in an airtight manner by means of a tube seal 9. A cap or cover 10 is secured above the stopper 8, and this cap 10 closes the sleeve 2 and limits the insertion or dipping stroke. The outer end of the dipstick 3 is bent into a loop 11.

Those parts shown in FIGS. 2a–2c which correspond to parts illustrated in the embodiment of FIGS. 1a–1c are provided with the same reference numerals, but with a prime (') added thereto. In contrast to FIGS. 1a–c, the sleeve 2' is straight, and the measuring rod or dipstick 3' which is guided in the sleeve 2' is embodied as a solid square rod or bar. The position of the rod 3' coaxial to the sleeve 2' is assured by a spacer 12 made of spring-plate strips riveted thereto. The stopper 8', which is sealed with respect to the sleeve 2' by O-rings 13, limits the insertion or dipping stroke by abutting against a restriction or narrowed portion 14 of the sleeve 2', the restriction having the shape of an inserted ring.

In summary, the present invention provides a device for measuring the oil level in a closed housing, especially of internal combustion engines and transmissions, with a sleeve fixed to the housing and a removable measuring rod or dipstick. The dipstick is provided with a stopper closing the sleeve, and an abutment limiting the insertion depth in the measuring position. This measuring device is characterized thereby that the end of the sleeve, which is located inside the housing, terminates below the minimum oil level. The sleeve is provided with openings for pressure equalization toward the interior of the housing. These openings are located as far as possible above the maximum oil level. In the measuring position, during insertion of the dipstick up to engagement or abutment, the stopper is located below the outer end of the sleeve by at least $1\frac{1}{2}$ times the oil column level corresponding to the overpressure in the housing.

In accordance with one embodiment of the present invention, the measuring device, including a sleeve having a round cross section and a dipstick comprising a sheet metal strip, is characterized in that the strip, in the region from the stopper to a place which in the measuring position is located slightly above the maximum oil level, has a width which corresponds essentially to the inner diameter of the sleeve, while, in the adjacent measuring region, the strip is on both sides drawn inwardly or reduced to a smaller width.

According to a further embodiment of the present invention, the measuring device, which is provided with a rigid dipstick of conventional cross section and a sleeve having a larger cross section, is characterized in that the dipstick is provided with a spacer member which in the measuring position is located slightly above the maximum oil level, the spacer member being adapted to the inner diameter of the sleeve and leaving a portion of the cross-sectional area free; the measuring region located below the spacer member is coaxial, and free of engagement, with respect to the sleeve. The stopper, together with a restricted or narrowed portion of the sleeve, may form the abutment for limiting the insertion depth.

Finally, the measuring device has a cap or cover fastened on the dipstick which together with the outer end of the sleeve forms the abutment for limiting the insertion depth.

The present invention is, of course, in no way restricted to the specific disclosure of the specification and drawings, but also encompasses any modifications within the scope of the appended claims.

What I claim is:

1. A device for overpressure measuring the oil level in a closed housing, especially of internal combustion engines and transmissions, said device comprising in combination:
    a sleeve fixedly connected to said housing, one end of said sleeve projecting into said housing and being adapted to end below the minimum oil level, said sleeve, within said housing, being provided with openings as far as possible above the maximum oil level for equalizing the pressure to the interior of said housing;
    a dipstick removably insertable in said sleeve;
    abutment means provided on at least one of said sleeve and said dipstick for limiting the depth of insertion of said dipstick in said sleeve in the measuring position; and
    a stopper arranged on said dipstick for closing said sleeve, said stopper, in the measuring position during insertion of said dipstick up to said abutment means, being located so far below the outer end of said sleeve by a distance equaling at least $1\frac{1}{2}$ times that oil column level corresponding to overpressure particularly in said housing such that an exact measurement of oil level is made possible directly free of any need to wipe said dipstick initially to avoid an erroneous or false oil level measurement therewith.

2. A device in combination according to claim 1, in which said sleeve has a round cross section and said dipstick comprises a sheet metal strip, the width of which in the region from said stopper to a location which in the measuring position is slightly above the maximum oil level corresponds essentially to the inner diameter of said sleeve, while the adjacent measuring region adjacent this location and proceeding in a direction remote from said stopper end of said sleeve has a width which is reduced on both sides thereof.

3. A device in combination according to claim 1, which includes a rigid dipstick of pre-determined cross section and a sleeve of larger cross section, said dipstick being provided with a spacer member which in the measuring position is located slightly above the maximum oil level, said spacer member being adapted to the inner diameter of said sleeve and leaving a portion of the cross-sectional area thereof free, the measuring region located below said spacer member being coaxial and free of wiping engagement with respect to said sleeve.

4. A device in combination according to claim 3, in which said sleeve includes an inner narrowed portion, said stopper and said narrowed portion together forming said abutment means.

5. A device in combination according to claim 2, in which said dipstick is provided with a cover near that end remote from the end projecting into said housing, said cover, together with the outer end of said sleeve, forming said abutment means.

* * * * *